United States Patent
Yuri

(10) Patent No.: US 8,093,733 B2
(45) Date of Patent: Jan. 10, 2012

(54) COGENERATION SYSTEM

(75) Inventor: Nobuyuki Yuri, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 342 days.

(21) Appl. No.: 12/454,621

(22) Filed: May 20, 2009

(65) Prior Publication Data

US 2009/0295158 A1 Dec. 3, 2009

(30) Foreign Application Priority Data

Jun. 3, 2008 (JP) ................... 2008-146202

(51) Int. Cl.
*H02G 5/00* (2006.01)

(52) U.S. Cl. ............................................. 290/2

(58) Field of Classification Search .............. 290/2, 4 R, 290/40 R, 52, 30 R; 123/2, 3; 60/618
See application file for complete search history.

(56) References Cited

U.S. PATENT DOCUMENTS

2003/0213246 A1* 11/2003 Coll et al. ................. 60/653

FOREIGN PATENT DOCUMENTS

JP 8-004586 A 1/1996
* cited by examiner

*Primary Examiner* — Quyen Leung
*Assistant Examiner* — Leda Pham
(74) *Attorney, Agent, or Firm* — Carrier Blackman & Associates, P.C.; Joseph P. Carrier; William D. Blackman

(57) ABSTRACT

In a cogeneration system having a generation unit equipped with a generator and an internal combustion engine, there is installed with a hot water unit including a first flow channel connecting a water supply source with a thermal load, a heat exchanger exchanging heat between water flowing the first flow channel and engine coolant, a first electromagnetic solenoid regulating flow rate of the water heated by the heat exchanger, a second flow channel connected to the first flow channel, a boiler heating water flowing through the second flow channel, and a second electromagnetic solenoid regulating flow rate of the water to be heated by the boiler. The temperatures of the engine coolant and water at the first and second flow channel joint are detected and operation of the first and second valves is controlled based on the detected temperatures, rendering hot water tank unnecessary, thereby achieving the compact structure.

13 Claims, 3 Drawing Sheets

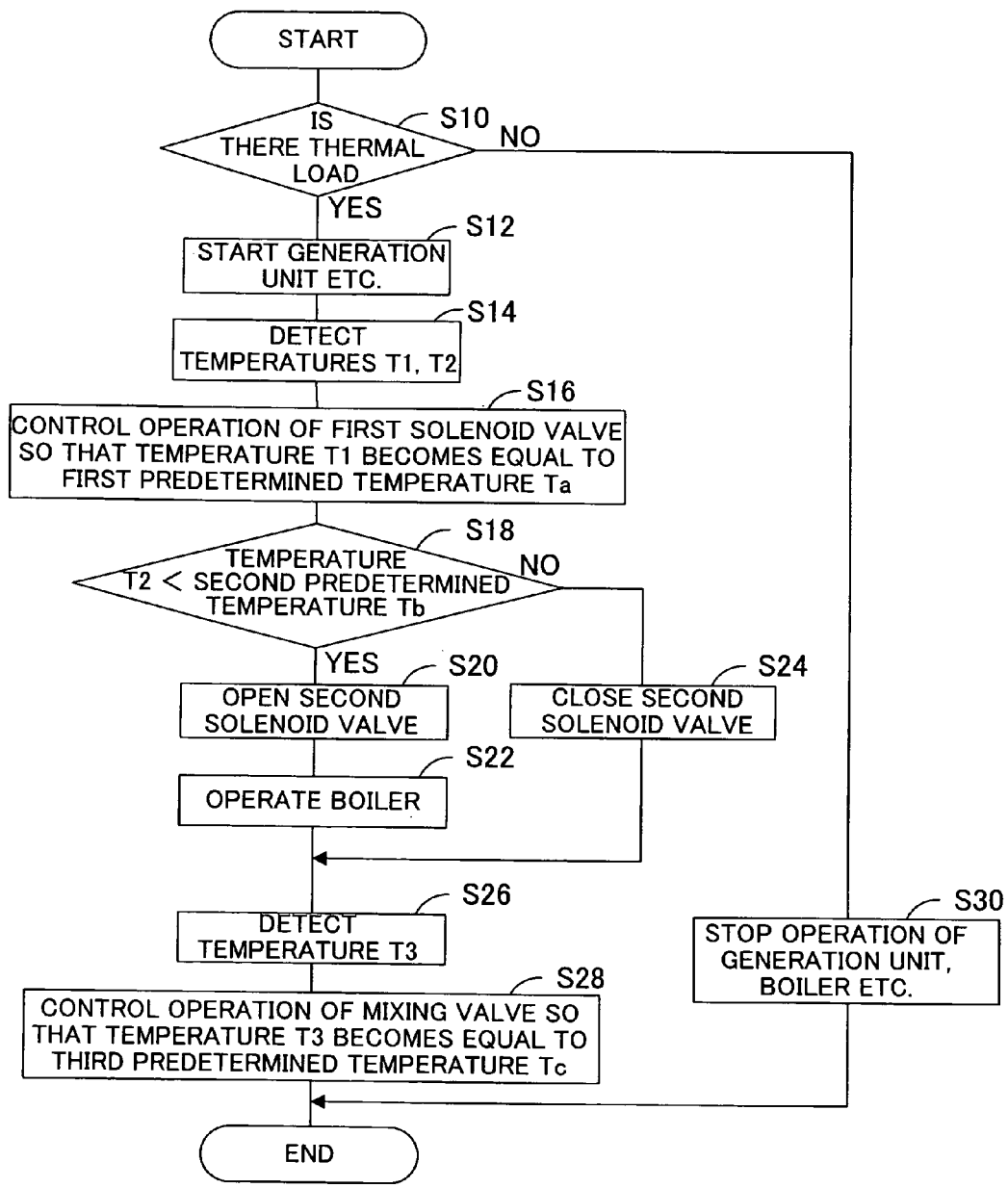

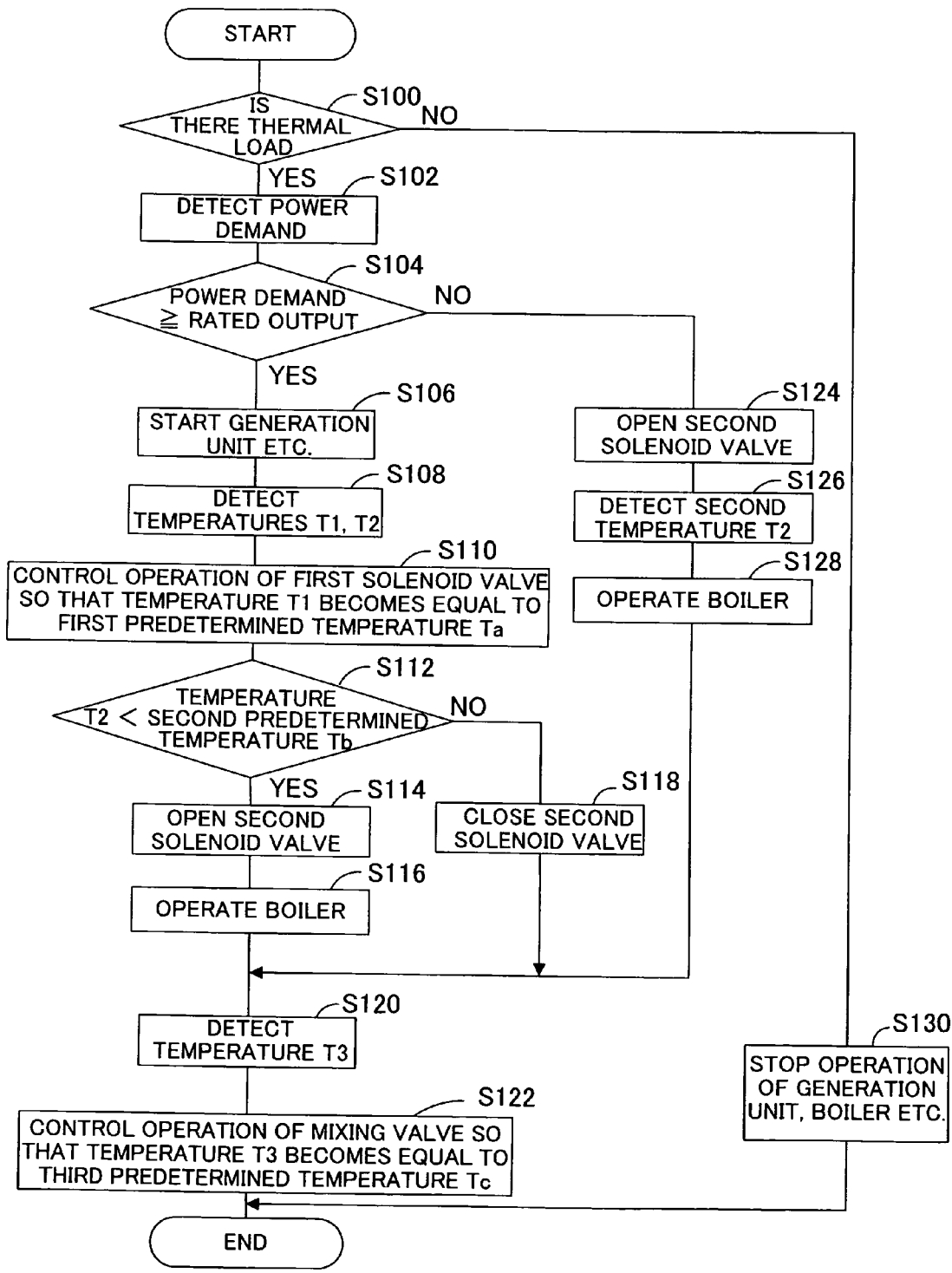

COGENERATION SYSTEM

BACKGROUND OF THE INVENTION

1. Field of the Invention

This invention relates to a cogeneration system, particularly to a cogeneration system having a generation unit equipped with a generator and an internal combustion engine for driving the generator.

2. Description of the Related Art

In recent years, cogeneration systems have been developed that are equipped with an internal combustion engine-driven generator and are installed in an AC power supply line between a commercial power network and an electrical load for supplying power to the load in interconnection with the power network and also for supplying hot water or the like heated using exhaust heat from the engine to a thermal load, as taught, for example, by Japanese Laid-Open Patent Application No. Hei 8 (1996)-4586.

As mentioned in the reference, such a cogeneration system is ordinarily equipped with a hot water tank that contains generated hot water. However, when the system is configured to have the tank, it causes increase in size and a space for the installation.

SUMMARY OF THE INVENTION

An object of this invention is therefore to overcome the foregoing disadvantage by providing a cogeneration system with no hot water tank, thereby achieving the compact structure.

In order to achieve the object, this invention provides a cogeneration system having a generation unit equipped with a generator adapted to be connectable to an AC power feed line between a commercial power network and an electrical load, and an internal combustion engine for driving the generator, comprising: a hot water unit including: a first flow channel that connects a water supply source with a thermal load to supply water from the water supply source to the thermal load; a heat exchanger that is installed in the first flow channel and exchanges heat between the water flowing through the first flow channel and coolant of the engine; a first electromagnetic solenoid valve that is installed in the first channel and regulates flow rate of the water heated by the heat exchanger; a second flow channel connected to the first flow channel to form a bypass between the heat exchanger and the first solenoid valve; a boiler that is installed in the second flow channel and heats water flowing through the second flow channel; and a second electromagnetic solenoid valve that is installed in the second flow channel and regulates flow rate of the water to be heated by the boiler; and an electronic control unit that detects at least one of a temperature of the coolant of the engine and a temperature of water at a joint where the first and second flow channels are joined and controls operation of the first and second solenoid valves based on the detected temperatures.

BRIEF DESCRIPTION OF THE DRAWINGS

The above and other objects and advantages of the invention will be more apparent from the following description and drawings in which:

FIG. 2 is a flowchart showing the operation of the cogeneration system shown in FIG. 1; and FIG. 3 is a flowchart similar to a part of FIG. 2 flowchart, but partially showing the operation of a cogeneration system according to a second embodiment of this invention.

DETAILED DESCRIPTION OF THE PREFERRED EMBODIMENTS

Figure 1:
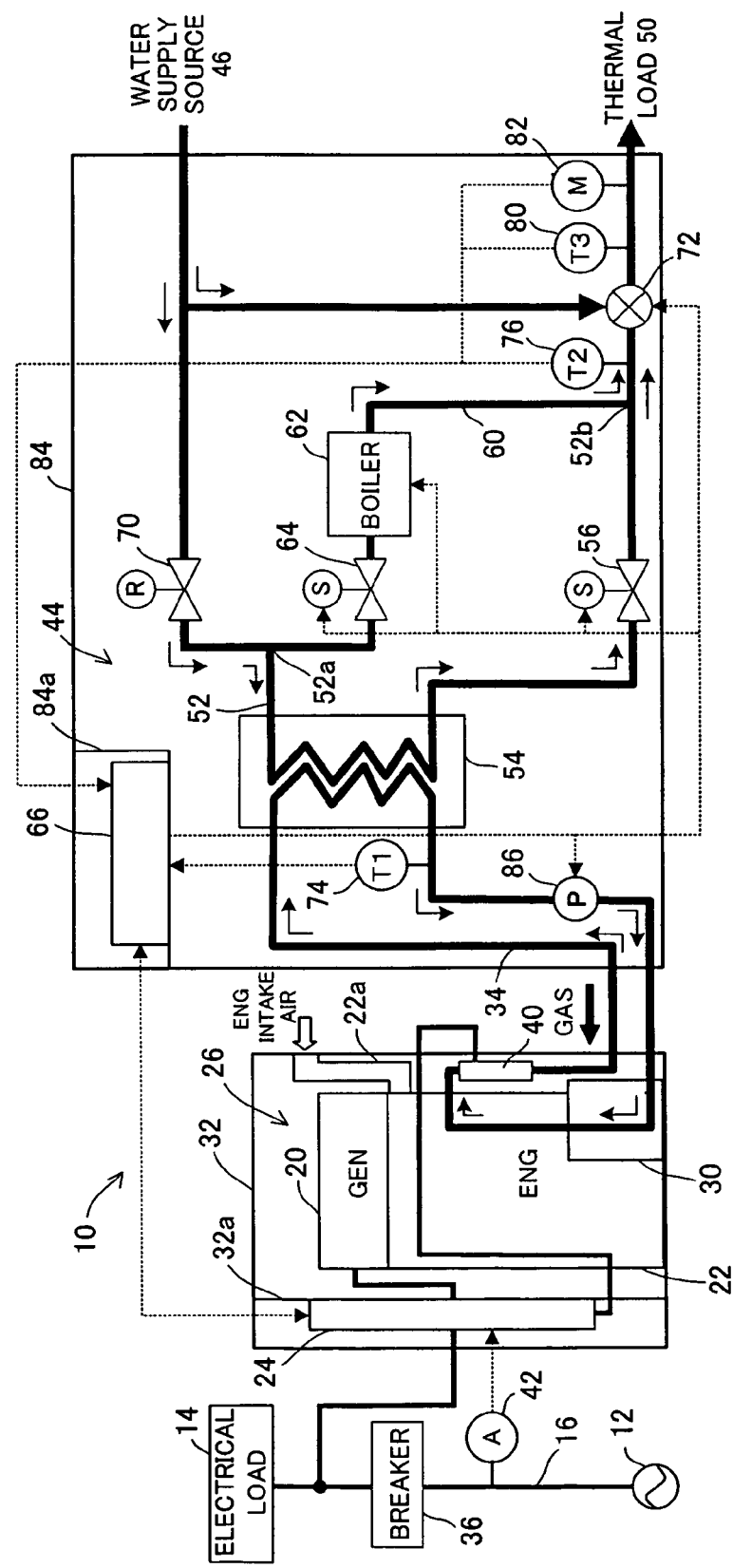
FIG. 1 is a block diagram giving an overall view of a cogeneration system according to a first embodiment of this invention.

A cogeneration system according to embodiments of the invention will now be explained with reference to the attached drawings.

FIG. 1 is a block diagram giving an overall view of a cogeneration system according to a first embodiment of this invention.

In FIG. 1, reference numeral 10 designates the cogeneration system. The cogeneration system 10 is equipped with a generation unit 26 having a generator (GEN) 20 constituted of multi-polar coils and connectable to an AC power feed line (power line) 16 between a commercial power source (commercial power network) 12 and electrical load (precisely, a lighting fixture, etc.) 14, an internal combustion engine (ENG; hereinafter called "engine") 22 for driving the generator 20 and a power controller 24, and with an exhaust-gas heat exchanger 30 that is connected to the engine 22 for further raising the temperature of heated coolant of the engine 22 by heat-exchanging with exhaust heat.

The power source 12 outputs or generates single-phase, three-wire, 100/200 V, 50 Hz (or 60 Hz) AC power. The generation unit 26 is integrally built and housed in a generation unit case 32 with the exchanger 30. Specifically, the generation unit case 32 is divided into two compartments by a partition 32a. The right compartment in the drawing accommodates the generator 20 and the engine 22 with exchanger 30 to be arranged above and below in a vertical direction in the axis of gravity. The left compartment accommodates the power controller 24.

The engine 22 is a single-cylinder, four-cycle, water-cooled, spark-ignition, OHV engine that runs on the city gas or LP (liquefied petroleum) gas and has a displacement of, for example, 163 cc. Although not shown in the drawing, the cylinder head and cylinder block of the engine 22 is laid in the lateral (horizontal) direction in the case 32, and a piston is accommodated in the cylinder to reciprocate.

Sucked air supplied from an air intake duct 22a is mixed with gas (indicated as GAS in FIG. 1) supplied from a gas supply source via a solenoid valve (not shown) by using a mixer. The air-fuel mixture thus produced flows into a combustion chamber and burns upon ignition by an ignition plug (not shown) to drive the piston, thereby rotating the crankshaft connected to the piston in a longitudinal (vertical) direction in the case 32. The generated exhaust gas passes through an exhaust pipe (not shown in FIG. 1) and is discharged to the exterior of the case 32.

Reference numeral 34 designates a passage of coolant (antifreeze liquid), i.e., coolant circulation passage, that cools down the engine 22. The passage 34 is formed to run through a heating region such as the cylinder block of the engine 22 and also through the exhaust-gas heat exchanger 30. The coolant flowing in the passage 34 exchanges heat with the heating region to raise its temperature, as cooling the engine 22, and passes through the exchanger 30 to be further heated.

The generator 20 constituted as the multi-polar coils is fastened on the crankcase at a location within a flywheel (not shown) attached to the upper end of the crankshaft. The flywheel is fixed with magnet pieces at its inner surface. The generator 20 produces alternating current when rotating relatively to the flywheel. The output of the generator 20 is sent to the power controller 24.

Although not shown in the drawing, the power controller 24 comprises an electronic control unit (ECU) that comprises a microcomputer, an inverter and a DC/DC converter. The inverter inverts the output of the generator 20 to 100/200 V AC power (single phase) through the DC/DC converter and the like.

The output (rated output) of power generation of the generation unit 26 is 1.0 kW or thereabout. The output of the inverter is connected to the power feed line 16 at a position downstream of a breaker 36 and supplied to the electrical load 14. The output is also supplied to an electric heater 40 that is disposed in the coolant passage 34. When, for example, surplus power is generated in the generation unit 26, the heater 40 is energized to heat the coolant flowing through the passage 34.

A current sensor (detector) 42 is installed in the power feed line 16, precisely at a position between the power source 12 and the breaker 36 and produces an output or signal indicative of current flowing therethrough. The output of the current sensor 42 is sent to the ECU of the power controller 24.

When the generator 20 is supplied with power from the power source 12 via the inverter, it functions as a starter motor for cranking the engine 22. The ECU of the power controller 24 switches the function of the generator 20 between the starter and the generator, and controls the operation of the engine 22 and the like.

In addition to the generation unit 26, the cogeneration system 10 includes a hot water unit or section 44.

The hot water unit 44 comprises a first flow channel 52 that connects a water supply source (such as a water pipe) 46 with a thermal load (e.g., hot water equipment of a kitchen and bathroom) 50 to supply water from the water supply source 46 to the thermal load 50, an exhaust heat exchanger (heat exchanger) 54 that is installed in the first channel 52 to heat the water flowing through the first channel 52 by the heat-exchange with the coolant of the engine 22 (i.e., coolant flowing through the passage 34), and a first electromagnetic solenoid valve 56 that is installed in the first channel 52, precisely at a position downstream of the exchanger 54 for regulating flow rate of the water heated by the exchanger 54. The terms "upstream" and "downstream" mean those in the direction of water (liquid; fluid) flow.

The hot water unit 44 further comprises a second flow channel 60 that is connected to the first channel 52, specifically branched from the first channel 52 at a branch point 52a to form a bypass between the exchanger 54 and the first solenoid valve 56, a boiler 62 that is installed in the second channel 60 for heating water flowing therethrough, a second electromagnetic solenoid valve 64 installed in the second channel 60, precisely at a position upstream of the boiler 62 for regulating flow rate of the water to be heated by the boiler 62, and a hot water controller 66.

The hot water controller 66 includes an electronic control unit (ECU) that comprises a microcomputer, similarly to the power controller 24, and the ECU of the hot water controller 66 is connected to the ECU of the power controller 24 to be able to communicate with each other. The boiler 62 is connected to the aforementioned gas supply source and, when the hot water controller 66 produces a drive signal, burns gas from the supply source to heat water flowing through the second channel 60.

Thus the hot water unit 44 is equipped with a plurality of channels from the water supply source 46 to the thermal load 50, specifically two channels of the first flow channel 52 installed with the exhaust heat exchanger 54 and first solenoid valve 56 and the second flow channel 60 installed with the boiler 62 and second solenoid valve 64. In FIG. 1, a joint where the first and second channels 52, 60 are joined is indicated by reference numeral 52b.

A pressure reducing valve 70 for reducing the pressure of high pressure water from the water supply source 46 is disposed at a position upstream of the branch point 52a. A mixing valve 72 for mixing water flowing through the first channel 52 with water from the water supply source 46 (precisely, water before its pressure is reduced by the pressure reducing valve 70) is disposed at a position downstream of the joint 52b.

As shown in FIG. 1, temperature sensors are installed in the passage 34 and first channel 52. Specifically, a first temperature sensor 74 is installed in the passage 34 near the outlet of the exhaust heat exchanger 54 and produces an output or signal indicative of temperature T1 of the coolant of the engine 22 flowing therethrough.

A second temperature sensor 76 is installed at the joint 52b, precisely in the first channel 52 at a position between the joint 52b and the mixing valve 72, and a third temperature sensor 80 is installed in the first channel 52 on downstream of the mixing valve 72. The second and third temperature sensors 76, 80 produce outputs or signals indicative of temperature T2 of water at the joint 52b and temperature T3 of water on downstream of the mixing valve 72, respectively.

A flow sensor (flow meter) 82 is installed in the first channel 52 at a position downstream of the mixing valve 72, i.e., between the mixing valve 72 and the thermal load 50 and produces an output or signal indicative of flow rate of water (hot water) supplied to the thermal load 50.

The hot water unit 44 thus configured is housed in a hot water unit case 84. Specifically, the case 84 is divided into two compartments by a partition 84a. The relatively large right compartment in the drawing accommodates the exhaust heat exchanger 54, boiler 62 and the like, and the upper left compartment accommodates the hot water controller 66. The controller 66 is isolated from the exchanger 54 and boiler 62 so that heat radiated from the boiler 62, etc., can be blocked as much as possible.

The explanation on generation of hot water in the hot water unit 44 will be made.

As shown in FIG. 1, the generation unit 26 and hot water unit 44 are interconnected by the coolant passage 34. Specifically, the passage 34 extends from the engine 22 toward the hot water unit 44 and is connected to the exchanger 54. The coolant flowing through the passage 34 is pumped to the exchanger 54 by an exhaust heat pump 86, heat-exchanged with water flowing through the first channel 52, and returns to the engine 22 through the exhaust-gas heat exchanger 30. Water flowing through the first channel 52 is heated by the heat exchange in the exchanger 54 and is changed to hot water to be supplied to the thermal load 50 through the first solenoid valve 56, joint 52b, mixing valve 72 and the like.

Water flowing through the second channel 60 is heated by the boiler 62 when the hot water controller 66 outputs the drive signal to the boiler 62 as mentioned above, and the resulting hot water is supplied to the thermal load 50 through the joint 52b, mixing valve 72 and the like.

The operations of the generation unit 26 and hot water unit 44 will be explained.

As shown in FIG. 1, the outputs of the first to third temperature sensors 74, 76, 80 and the flow sensor 82 are sent to the ECU of the hot water controller 66. Based on the inputted outputs and the like, the ECU of the controller 66 controls the operations of the generation unit 26 and hot water unit 44 (i.e., the first and second solenoid valve 56, 64, mixing valve 72, boiler 62 and exhaust heat pump 86).

FIG. 2 is a flowchart showing the operation of the ECU of the controller 66, i.e., of the cogeneration system 10 according to this embodiment. The illustrated program is executed at a predetermined interval, e.g., 100 milliseconds.

The program begins in S10, in which it is determined whether there is a thermal demand in the thermal load 50. Specifically, the determination is made based on the output of the flow sensor 82, more specifically, when water is supplied to the thermal load 50, it is determined that there is a thermal demand (i.e., the load 50 is in use by the user), while, when water is not supplied, it is determined that there is no thermal demand (i.e., the load 50 is not in use).

When the result in S10 is Yes, the program proceeds to S12, in which the engine 22 is started via the generation controller 24 to start the generation unit 26 and operate the exhaust heat pump 86. As a result, the coolant of the engine 22 is heated by the heating region of the engine 22 and exhaust gas heat exchanger 30 and is supplied to the exhaust heat exchanger 54 through the passage 34.

The program then proceeds to S14, in which the coolant temperature T1 and the water temperature T2 at the joint 52b are detected or calculated based on the outputs of the first and second temperature sensors 74, 76, and to S16, in which the operation of the first solenoid valve 56 is controlled based on the detected temperature (precisely, the coolant temperature T1), specifically, the control is made so that the coolant temperature T1 becomes equal to a first predetermined temperature Ta (e.g., 65° C.).

More specifically, when the temperature T1 is equal to or greater than the first predetermined temperature Ta, the first solenoid valve 56 is gradually opened to increase the flow rate of water flowing through the first channel 52 (i.e., water to pass through the exhaust heat exchanger 54 to be heated thereby) and when it is less than the temperature Ta, the first solenoid valve 56 is gradually closed to decrease the flow rate. As a result, the coolant temperature T1 approaches the first predetermined temperature Ta.

The program then proceeds to S18, in which it is determined whether the water temperature T2 detected in S14 is less than a second predetermined temperature Tb (e.g., 60° C.). When the result in S18 is Yes, the program proceeds to S20, in which the second solenoid valve 64 is opened and to S22, in which the boiler 62 is operated.

Specifically, when the water temperature T2 is less than the second predetermined temperature Tb, i.e., a heat quantity of the water heated by the exhaust heat exchanger 54 is insufficient, the second solenoid valve 64 is opened and the boiler 62 is operated to heat the water flowing through the second channel 60, thereby raising the water temperature T2 at the joint 52b, i.e., compensating the insufficient heat quantity.

On the other hand, when the result in S18 is No, since it means that the heat quantity at the joint 52b is sufficient, the program proceeds to S24, in which the second solenoid valve 64 is closed so as to block hot water heated by the boiler 62 from flowing to the joint 52b.

Thus since the operations of the first and second solenoid valves 56, 64 are controlled based on the coolant temperature T1 and the water temperature T2 at the joint 52b, it becomes possible to control the temperature T2, i.e., the temperature of water (hot water) to be supplied to the thermal load 50 to be appropriate or optimal value.

The program proceeds to S26, in which the water temperature T3 on downstream of the mixing valve 72 is detected or calculated based on the output of the third temperature sensor 80 and to S28, in which the operation of the mixing valve 72 is controlled based on the detected temperature T3.

Specifically, the control is made so that the water temperature T3 becomes equal to a third predetermined temperature (predetermined temperature) Tc, i.e., water (hot water) flowing through the first channel 52 is mixed with water from the water supply source 46 using the mixing valve 72. The third predetermined temperature Tc is set to the optimal water temperature (e.g., 65° C.) for the thermal load 50 to be supplied with the hot water.

When the result in S10 is No, since it means that there is no thermal demand in the thermal load 50, the program proceeds to S30, in which the operation of the engine 22 is stopped via the generation controller 24 to stop the generation unit 26, and the pump 86, boiler 62 and other components are also stopped. Thus the program is terminated.

As stated in the foregoing, the cogeneration system according to the first embodiment is configured to install the exhaust heat exchanger 54 adapted to heat-exchange with the coolant of the engine 22 for heating the coolant and the first solenoid valve 56 adapted to regulate the flow rate of the heated water in the first flow channel 52 that supplies water from the water supply source 46 to the thermal load 50, and install the boiler 62 and the second solenoid valve 64 adapted to regulate the flow rate of water heated by the boiler 62 in the second flow channel 60 that is connected to the first channel 52 to form a bypass between the exchanger 54 and the first solenoid valve 56, wherein the operations of the first and second solenoid valves 56, 64 are controlled based on the temperature T1 of the coolant and the temperature T2 of water at the joint 52b (specifically, based on the detected temperatures T1, T2, the flow rate of water (hot water) heated by the exchanger 54 and flowing through the first channel 52 is regulated by the first solenoid valve 56 and the flow rate of water (hot water) heated by the boiler 62 and flowing through the second channel 60 is regulated by the second solenoid valve 64), thereby supplying hot water to the thermal load 50. Owing to this configuration, it becomes possible to supply hot water at temperature optimal for the thermal load 50, thereby enabling to remove a hot water tank because it is not necessary to contain hot water. With this, the cogeneration system 10 can be compact in size and it leads to decrease in a space of the installment of the system and cost.

Further, in the system 10, the mixing valve 72 is installed on downstream of the joint 52b where the first and second channels 52, 60 are joined for mixing water flowing through the first channel 52 with water from the water supply source 46 and the ECU of the hot water controller 66 controls the operation of the mixing valve 72 so that the water temperature T2 on downstream of the valve 72 becomes the third predetermined temperature Tc. With this, the temperature of water (hot water) supplied to the thermal load 50 through the first and second channels 52 and mixing valve 72 can be made a further appropriate value.

Next, a cogeneration system according to a second embodiment will be explained.

The explanation will be made with focus on points of difference from the first embodiment. In the second embodiment, a power demand in the electrical load 14 is detected and the operations of the generation unit 26 and hot water unit 44 are controlled based on the detected demand.

FIG. 3 is a flowchart partially similar to FIG. 2 flowchart, but partially showing the operation of the ECU of the hot water controller 66 of the cogeneration system according to the second embodiment.

The program begins in S100, in which the same processing as was explained in S10 of FIG. 2 in the first embodiment is conducted. When the result is Yes, since it means that there is a thermal demand in the thermal load 50, the program proceeds to S102, in which a power demand in the electrical load 14 is detected, specifically, a power demand (electricity usage) in the electrical load 14 is detected or calculated based on the output of the current sensor 42.

The program then proceeds to S104, in which it is determined whether the detected power demand is equal to or greater than a predetermined value (the rated power of the generation unit 26, i.e., 1.0 kW). When the result in S104 is Yes, the program proceeds to S106 to S122, in which the same processing as was explained in S12 to S28 of the FIG. 2 flowchart is conducted.

On the other hand, when the result is No, since it means that the power demand is less than the predetermined value, i.e., the current detected by the current sensor 42 is less than a predetermined value, the program proceeds to S124, in which only the second solenoid valve 64 is opened.

The program then proceeds to S126, the water temperature T2 at the joint 52b is detected or calculated based on the output of the second temperature sensor 76 and to S128, the boiler 62 is operated based on the detected temperature T2. Specifically, the operation of the boiler 62 is controlled so that the temperature T2 becomes equal to a fourth predetermined temperature Td (e.g., 60° C.).

The program then proceeds to S120 and S122, in which the same processing as was mentioned in S26 and S28 is conducted and the program is terminated. When the result in S10 is No, the program proceeds to S130 in which the same processing as was described in S30 is conducted.

Thus the cogeneration system according to the second embodiment is configured to detect current flowing through the power feed line 16 and, when the detected current is less than the predetermined value, open only the second solenoid valve 64. With this, when the current is less than the predetermined value, i.e., a power demand in the electrical load 14 is relatively small, it becomes possible to supply only the water (hot water) heated by the boiler 62 (which is superior in thermal efficiency to the exhaust heat exchanger 54) and flowing through the second channel 60 to the thermal load 50 without operating the generation unit 24, thereby improving energy efficiency.

The remaining configuration is the same as that in the first embodiment.

As stated above, the first and second embodiments are configured to have a cogeneration system (10) having a generation unit (26) equipped with a generator (20) adapted to be connectable to an AC power feed line (16) between a commercial power network (12) and an electrical load (14), and an internal combustion engine (22) for driving the generator, comprising: a hot water unit (44) including: a first flow channel (52) that connects a water supply source (46) with a thermal load (50) to supply water from the water supply source to the thermal load; a heat exchanger (exhaust heat exchanger 54) that is installed in the first flow channel and exchanges heat between the water flowing through the first flow channel and coolant of the engine; a first electromagnetic solenoid valve (56) that is installed in the first channel and regulates flow rate of the water heated by the heat exchanger; a second flow channel (60) connected to the first flow channel to form a bypass between the heat exchanger and the first solenoid valve; a boiler (62) that is installed in the second flow channel and heats water flowing through the second flow channel; and a second electromagnetic solenoid valve (64) that is installed in the second flow channel and regulates flow rate of the water to be heated by the boiler; and an electronic control unit (ECU of the hot water controller 66, S14 to S24, S108 to S118) that detects at least one of a temperature of the coolant of the engine (T1) and a temperature of water at a joint (52b) where the first and second flow channels are joined (T2) and controls operation of the first and second solenoid valves based on the detected temperatures.

In the system, the electronic control unit detects the temperature of the coolant of the engine (T1) and controls operation of the first solenoid valve (56) such that the detected temperature of the coolant becomes a prescribed temperature Ta (S14, S16, S108, S110).

In the system, the electronic control unit detects the temperature of the water at the joint (T2) and controls operation of the second solenoid valve (64) such that the detected temperature of the water becomes a prescribed (appropriate or optimal) temperature (S18 to S24, S112 to S118).

The system further includes: a current detector (current sensor 42) that is installed in the power feed line and detects current flowing through the power feed line, wherein the electronic control unit opens only the second solenoid valve (64) when the detected current is less than a predetermined value (S100 to S108).

The system further includes: a mixing valve (72) that is installed on downstream of the joint and mixes the water flowing through the first flow channel with water from the water supply source, wherein the electronic control unit controls operation of the mixing valve so that a temperature of water at a position downstream of the mixing valve (T3) becomes equal to a predetermined temperature (Tc, S26, S28, S120, S122).

It should be noted that, in the second embodiment, although the generation unit 26 and the like are started when the power demand is at or above the rated output of the generation unit 26, the starting of the generation unit 26, etc., can instead be determined based on data obtained by, for example, measuring the power demand and thermal demand during a predetermined period.

It should also be noted that, in the first and second embodiments, instead of a gas engine using gas fuel such as the city gas or LP gas exemplified as the power source of the generator 20, it can be an engine using gasoline fuel or the like. Further, although the rated output of the generation unit 26, displacement of the engine 22 and the like are shown by specific values, they are only examples and not limited thereto.

It should further be noted that, although the AC power outputted from the power source 12 is defined as 100/200 V, when a power source outputs AC power exceeding 100/200 V, the generation unit 26 should naturally output voltage corresponding to that power.

Japanese Patent Application No. 2008-146202 filed on Jun. 3, 2008, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A cogeneration system having a generation unit equipped with a generator adapted to be connectable to an AC power feed line between a commercial power network and an electrical load, and an internal combustion engine for driving the generator, comprising:
   a hot water unit including:
      a first flow channel that connects a water supply source with a thermal load to supply water from the water supply source to the thermal load;

a heat exchanger that is installed in the first flow channel and exchanges heat between the water flowing through the first flow channel and coolant of the engine;

a first electromagnetic solenoid valve that is installed in the first channel and regulates flow rate of the water heated by the heat exchanger;

a second flow channel connected to the first flow channel to form a bypass between the heat exchanger and the first solenoid valve;

a boiler that is installed in the second flow channel and heats water flowing through the second flow channel; and a second electromagnetic solenoid valve that is installed in the second flow channel and regulates flow rate of the water to be heated by the boiler; and an electronic control unit that detects at least one of a temperature of the coolant of the engine and a temperature of water at a joint where the first and second flow channels are joined and controls operation of the first and second solenoid valves based on the detected temperatures.

2. The system according to claim 1, wherein the electronic control unit detects the temperature of the coolant of the engine and controls operation of the first solenoid valve such that the detected temperature of the coolant becomes a prescribed temperature.

3. The system according to claim 1, wherein the electronic control unit detects the temperature of the water at the joint and controls operation of the second solenoid valve such that the detected temperature of the water becomes a prescribed temperature.

4. The system according to claim 1, further including:
a current detector that is installed in the power feed line and detects current flowing through the power feed line,
wherein the electronic control unit opens only the second solenoid valve when the detected current is less than a predetermined value.

5. The system according to claim 1, further including:
a mixing valve that is installed on downstream of the joint and mixes the water flowing through the first flow channel with water from the water supply source,
wherein the electronic control unit controls operation of the mixing valve so that a temperature of water at a position downstream of the mixing valve becomes equal to a predetermined temperature.

6. A cogeneration system having a generation unit equipped with a generator adapted to be connectable to an AC power feed line between a commercial power network and an electrical load, and an internal combustion engine for driving the generator, comprising:
a hot water unit including:
a first flow channel that connects a water supply source with a thermal load to supply water from the water supply source to the thermal load;
a heat exchanger that is installed in the first flow channel and exchanges heat between the water flowing through the first flow channel and coolant of the engine;
a first electromagnetic solenoid valve that is installed in the first channel and regulates flow rate of the water heated by the heat exchanger;
a second flow channel connected to the first flow channel to form a bypass between the heat exchanger and the first solenoid valve;
a boiler that is installed in the second flow channel and heats water flowing through the second flow channel; and
a second electromagnetic solenoid valve that is installed in the second flow channel and regulates flow rate of the water to be heated by the boiler;
an electronic control unit that detects at least one of a temperature of the coolant of the engine and a temperature of water at a joint where the first and second flow channels are joined and controls operation of the first and second solenoid valves based on the detected temperatures; and
a mixing valve that is installed on downstream of the joint and mixes the water flowing through the first flow channel with water from the water supply source,
wherein the electronic control unit controls operation of the mixing valve so that a temperature of water at a position downstream of the mixing valve becomes equal to a predetermined temperature.

7. The system according to claim 6, wherein the electronic control unit detects the temperature of the coolant of the engine and controls operation of the first solenoid valve such that the detected temperature of the coolant becomes a prescribed temperature.

8. The system according to claim 6, wherein the electronic control unit detects the temperature of the water at the joint and controls operation of the second solenoid valve such that the detected temperature of the water becomes a prescribed temperature.

9. The system according to claim 6, further including: a current detector that is installed in the power feed line and detects current flowing through the power feed line, wherein the electronic control unit opens only the second solenoid valve when the detected current is less than a predetermined value.

10. A cogeneration system having a generation unit equipped with a generator adapted to be connectable to an AC power feed line between a commercial power network and an electrical load, and an internal combustion engine for driving the generator, comprising:
a hot water unit including:
a first flow channel that connects a water supply source with a thermal load to supply water from the water supply source to the thermal load;
a heat exchanger that is installed in the first flow channel and exchanges heat between the water flowing through the first flow channel and coolant of the engine;
a first electromagnetic solenoid valve that is installed in the first channel and regulates flow rate of the water heated by the heat exchanger;
a second flow channel connected to the first flow channel to form a bypass between the heat exchanger and the first solenoid valve;
a boiler that is installed in the second flow channel and heats water flowing through the second flow channel; and
a second electromagnetic solenoid valve that is installed in the second flow channel and regulates flow rate of the water to be heated by the boiler;
an electronic control unit that detects at least one of a temperature of the coolant of the engine and a temperature of water at a joint where the first and second flow channels are joined and controls operation of the first and second solenoid valves based on the detected temperatures; and a current detector that is installed in the power feed line and detects current flowing through the power feed line, wherein the electronic control unit opens only the second solenoid valve when the detected current is less than a predetermined value.

11. The system according to claim 10, wherein the electronic control unit detects the temperature of the coolant of the engine and controls operation of the first solenoid valve such that the detected temperature of the coolant becomes a prescribed temperature.

12. The system according to claim 10, wherein the electronic control unit detects the temperature of the water at the joint and controls operation of the second solenoid valve such that the detected temperature of the water becomes a prescribed temperature.

13. The system according to claim 10, further including:

a mixing valve that is installed on downstream of the joint and mixes the water flowing through the first flow channel with water from the water supply source, wherein the electronic control unit controls operation of the mixing valve so that a temperature of water at a position downstream of the mixing valve becomes equal to a predetermined temperature.

* * * * *